(12) United States Patent
Amamori

(10) Patent No.: US 7,387,312 B2
(45) Date of Patent: Jun. 17, 2008

(54) STEERING APPARATUS

(75) Inventor: Ichiro Amamori, Hikone (JP)

(73) Assignee: Takata Corporation (JP)

( * ) Notice: Subject to any disclaimer, the term of this patent is extended or adjusted under 35 U.S.C. 154(b) by 297 days.

(21) Appl. No.: 11/115,482

(22) Filed: Apr. 27, 2005

(65) Prior Publication Data

US 2005/0236820 A1 Oct. 27, 2005

(30) Foreign Application Priority Data

Apr. 27, 2004 (JP) .............................. 2004-132004

(51) Int. Cl.
*B60R 21/16* (2006.01)
(52) U.S. Cl. ..................................... 280/731; 200/61.55
(58) Field of Classification Search ................ 280/731, 280/728.2; 200/61.54, 61.55; *B60R 21/16, B60R 21/20*
See application file for complete search history.

(56) References Cited

U.S. PATENT DOCUMENTS

| 5,239,147 A | 8/1993 | Allard et al. |
| 6,299,201 B1 * | 10/2001 | Fujita ......................... 280/731 |
| 2001/0035631 A1 | 11/2001 | Hasebe |
| 2001/0054809 A1 | 12/2001 | Igawa et al. |
| 2002/0079678 A1 | 6/2002 | Kai et al. |
| 2002/0153709 A1 | 10/2002 | Abe |
| 2003/0155752 A1 * | 8/2003 | Xu et al. ..................... 280/731 |

FOREIGN PATENT DOCUMENTS

| EP | 1 074 435 A2 | 2/2001 |
| EP | 1 393 996 A1 | 3/2004 |
| JP | 03-091262 U | 9/1991 |
| JP | 10-100832 A | 4/1998 |
| JP | 10-244946 A | 9/1998 |
| JP | 11-278194 A | 10/1999 |

OTHER PUBLICATIONS

A search report dated Jan. 3, 2007, from the European Patent Office in corresponding European Application No. 05005974.0-2421.

* cited by examiner

*Primary Examiner*—Ruth Ilan
*Assistant Examiner*—Drew J. Brown
(74) *Attorney, Agent, or Firm*—Fitch, Even, Tabin & Flannery

(57) ABSTRACT

To improve the appearance of the steering apparatus and the operability of the horn operating cover in a steering apparatus mounted in a vehicle, a steering apparatus and airbag device are disclosed. In form of a steering apparatus, a module cover for operating a horn turns in a direction of the initial position and the horn operating position with respect to a fulcrum independently from the retainer which is fixedly mounted on the cover counter-surface of the steering wheel.

19 Claims, 7 Drawing Sheets

STEERING APPARATUS

FIELD OF THE INVENTION

The present invention relates to a construction of a steering apparatus being mounted on vehicles such as cars.

BACKGROUND OF THE INVENTION

A conventional construction in which an airbag device and a horn mechanism are mounted in a steering apparatus is known (refer to Japanese Unexamined Patent Application Publication No. 10-100832).

In a steering apparatus in the '832 Japanese Publication, when a vehicle occupant presses an airbag cover, a movable contact abuts a fixed contact and sounds a horn.

In particular, in the '832 Japanese Publication, the detailed construction of the steering apparatus in which the airbag device and the horn mechanism are mounted is known, but in the steering apparatus, it is strongly suggested that the appearance of the steering apparatus be improved by decreasing a gap between an outer peripheral portion of the horn operating cover and the steering wheel and the operability of the horn operating cover be improved by minimizing a pressing load in operating the horn. As a result, these matters should be considered in designing a steering apparatus.

SUMMARY OF THE INVENTION

The present invention is achieved considering the above matters, and it is an object to provide an effective art to improve the appearance of the steering apparatus and the operability of the horn operating cover in the steering apparatus mounted in vehicles.

In order to achieve the above-mentioned object, the present invention is constructed. In addition, the present invention can be applied to construction of a steering apparatus mounting an airbag device and a horn mechanism therein in vehicles including cars.

A first aspect of the present invention which solves the above problems relates to a steering apparatus as described below.

The steering apparatus according to the first aspect comprises at least a steering wheel for steering a vehicle, an airbag device, a horn operating cover, biasing means, and a horn mechanism capable of outputting a horn sound. The airbag device is a device in which an airbag can be deployed and inflated toward a vehicle occupant protection area at the time of collision. The horn operating cover is a cover fastened to the steering wheel for covering the side of the airbag of the airbag device facing a vehicle occupant. Typically, an airbag cover which covers the side of the airbag facing a vehicle occupant is used as such a horn operating cover. The biasing means is means having a function of biasing the fastened horn operating cover toward an initial position. Typically, a construction is used in which the horn operating cover is set to a predetermined initial position in a state being pressed by elastic biasing means, a coiled spring and a plate spring.

In the present invention, the horn operating cover is pressed against a biasing force of the biasing means to be moved to a horn operating position to operate the horn mechanism; and the pressing of the horn operating cover is released to move the horn operating cover to the initial position by the biasing force of the biasing means, thereby turning off the horn mechanism. Specifically, in the present invention, the 'initial position' is defined as a predetermined set position (waiting position) of the horn operating cover, before the horn operating cover is pressed by a vehicle occupant. Also, the 'horn operating position' is a predetermined set position of the horn operating cover when the horn operating cover is operated.

In particular, in the present invention, the airbag device is mounted on a cover counter-surface opposite to the horn operating cover of the steering wheel, and the horn operating cover is constructed so as to be able to turn about a fulcrum toward the initial position or the horn operating position independently from the airbag device which is mounted on the cover counter-surface of the steering wheel. Here, the 'fulcrum' of the horn operating cover can always be formed in a fixed (specified) area independently from pressed positions of the horn operating cover by a vehicle occupant. However, in the present invention, an area where the fulcrum is formed may be varied according to pressed positions of the horn operating cover by a vehicle occupant.

According to the construction of the steering wheel in the first aspect, because the fulcrum is formed in the vicinity of the outer peripheral portion of the horn operating cover, the outer peripheral portion of the horn operating cover is difficult to move relative to the steering wheel. As a result, the gap between the outer peripheral portion of the horn operating cover and the steering wheel can be extremely small, which leads to an improved appearance of the steering apparatus.

Further, a horn operating cover having a construction which turns about the fulcrum is used, so that the horn operating cover is reliably turned to the operation position with a small pressing load, which improves the operability of the horn operating cover related to the horn operation. In the present invention, especially, the horn operating cover moves independently from the airbag device which is mounted on the cover counter-surface, so that a pressing load in operating the horn is lessened compared to a horn operating cover integrally moving along with an airbag device. Further, the provision of the fulcrum of the horn operating cover lessens the number of biasing means (for instance, the coiled spring) which biases the horn operating cover to the initial position, and the adjustment of a biasing force by the biasing means becomes easy when varying the size of the horn operating cover. Meanwhile, because the actual airbag device is mounted on the cover counter-surface, the airbag is effectively deployed independently from the turning movement of the horn operating cover.

In addition, the pressed direction of the horn operating cover by a vehicle occupant is enough as long as a pressing force component from the initial position toward the operation position can be obtained by pressing the horn operating cover. Also, the pressed direction (the input direction of the pressing force) of the horn operating cover may or may not coincide with the operating direction of the horn operating cover. When the pressed direction does not coincide with the operating direction, they may cross each other. However, even in this case, a pressing force from the initial position toward the operation position can be obtained by pressing the horn operating cover.

A second aspect of the present invention which solves the problems relates to the steering apparatus as described below.

The steering apparatus according to the second aspect has a construction according to the first aspect in which, with reference to a plan view of the steering apparatus, the horn operating cover has the fulcrum in a lower area of the horn operating cover. Typically, 'a lower area of the horn operating cover' is an area in the vicinity of a spoke located in the six-o-clock direction of the steering wheel, in the case of a 3-spoke steering wheel, and an area in the vicinity of located in the four to five-o-clock direction and the seven to eight-o-clock direction of the steering wheel, in the case of a 4-spoke steering wheel.

According to the construction of the steering apparatus of the second aspect, the fulcrum of the horn operating cover is always formed in a fixed lower area of the horn operation area independently from pressed positions by a vehicle occupant, so that the gap between the outer peripheral portion of the horn operating cover and the steering wheel can be extremely small, which effectively stabilizes the turning movement of the horn operating cover. Further, according to this construction, an upper area of the horn operating cover to which vehicle occupant's hands are easily accessible while a vehicle occupant holds the steering wheel with his/her hands can be a pressing operation area, which secures good operability of the horn operating cover.

A third aspect of the present invention which solves the problems relates to the steering apparatus as described below.

The steering apparatus according to the third aspect has a construction according to the first or second aspect in which, with reference to a side view of the steering apparatus, the fulcrum is provided above the center of gravity of the airbag device.

According to the construction of the steering apparatus of the third aspect, an area above the center of gravity of the airbag device can be effectively used as an arrangement area for the fulcrum.

A fourth aspect of the present invention which solves the problems relates to the steering apparatus as described below.

The steering apparatus of the fourth aspect has a construction according to any one of the first to third aspects in which the horn operating cover comprises at least a leg portion and an elongated hole. The leg portion is a portion which extends from an extending surface of the horn operating cover toward the cover counter-surface. The elongated hole is a hole which is formed in the leg portion longitudinally along the extending direction of the leg portion. The airbag device has an upright portion which extends in the extending direction of the leg portion with respect to a retainer accommodating the airbag, the upright portion also being engaged with the elongated hole. The elongated hole allows the horn operating cover to move relative to the retainer in the extending direction of the leg portion while being engaged with the upright portion, whereby the horn operating cover is allowed to turn about the fulcrum.

As for the construction of the above-mentioned 'elongated hole', any elongated hole can be used as long as it has a longitudinally extended portion and various shapes of elongated hole can be employed only if they can obtain desired effects in cooperation with the upright portion. For instance, a longitudinal hole which extends straight, a longitudinal hole which extends curvedly, a longitudinal hole which extends in steps, etc. can be employed.

According to the construction of the steering apparatus of the fourth aspect, the horn operating cover smoothly turns by the cooperation between the upright portion of the retainer and the elongated hole of the horn operating cover.

A fifth aspect of the present invention which solves the problems relates to the steering apparatus as described below.

The steering apparatus of the fifth aspect has a construction according to the fourth aspect in which fastening means which fastens the horn operating cover to the steering wheel comprises at least a shaft member, a fitting hole, and slip-off preventing means. The shaft member is formed in a shaft shape and extends toward the cover counter-surface from an outer peripheral side farther than the leg portion on the extended surface of the horn operating cover. The shaft member may be integrally molded with the horn operating cover, and may be separately molded and detachably or fixedly mounted to the horn operating cover. The fitting hole has a construction in which the shaft member can be fitted on the cover counter-surface. The slip-off preventing means prevents the shaft member fitted into the fitting hole from slipping off from the steering wheel.

According to the construction of the steering apparatus of the fifth aspect, the fastening means which fastens the horn operating cover to the steering wheel can be simplified and the assembling of the horn operating cover into the steering wheel can be improved.

A sixth aspect of the present invention which solves the problems relates to the steering apparatus as described below.

The steering apparatus of the sixth aspect has a construction according to the fifth aspect in which biasing means includes a coiled spring interposed between the horn operating cover and the steering wheel at a position corresponding to the shaft member. By this construction, the coiled spring whose one end is supported by the steering wheel elastically biases the horn operating cover toward the initial position.

According to the construction of the steering apparatus of the sixth aspect, the coiled spring is used to bias the fastened horn operating cover toward the initial position.

A seventh aspect of the present invention which solves the problems relates to the steering apparatus as described below.

The steering apparatus of the seventh aspect has a construction according to the fifth aspect in which the biasing means includes a plate spring interposed between the leg portion and the retainer. By this construction, the plate spring whose one end is supported by the retainer elastically biases the horn operating cover toward the initial position.

According to the construction of the steering apparatus of the seventh aspect, the plate spring is used to bias the fastened horn operating cover toward the initial position. Typically, while the plate spring is arranged at a bottom of the retainer, one end of the plate spring is bolted to the bottom of the retainer. Meanwhile, the other end of the plate spring extends in a direction of the leg portion and supports the leg portion from the bottom. By this construction, if the horn operating cover has a smaller width in a lower area and enough space is not available to accommodate biasing means in the lower area, it is possible to cope with the need by arranging the plate spring in a limited area.

An eighth aspect of the present invention which solves the problems relates to the steering apparatus as described above.

The steering apparatus of the eighth aspect has a construction according to any one of the first to seventh aspects in which the airbag device is constructed as a pre-assembled body which is already assembled into the horn operating cover when being mounted on the steering wheel. Namely, the airbag device having the horn operating cover is assembled into the steering wheel.

According to the construction of the steering apparatus of the eighth aspect, since the airbag device is assembled into the steering wheel along with the horn operating cover, the assembling of the steering apparatus can be improved.

As described above, according to the present invention, the horn operating cover is constructed so as to be able to turn about a fulcrum toward the initial position or the horn operating position independently from the airbag device which is fixedly mounted on the cover counter-surface of the steering wheel, which improves the appearance of the steering apparatus and the operability of the horn operating cover.

DETAILED DESCRIPTION OF THE PREFERRED EMBODIMENTS

Hereinafter, preferred embodiments of the present invention will be described in detail with reference to FIGS. 1 to 5. First, the construction of a steering apparatus 100 for a vehicle that is an embodiment of a 'steering apparatus' of the present invention will be described with reference to FIGS. 1 to 5.

Figure 1:
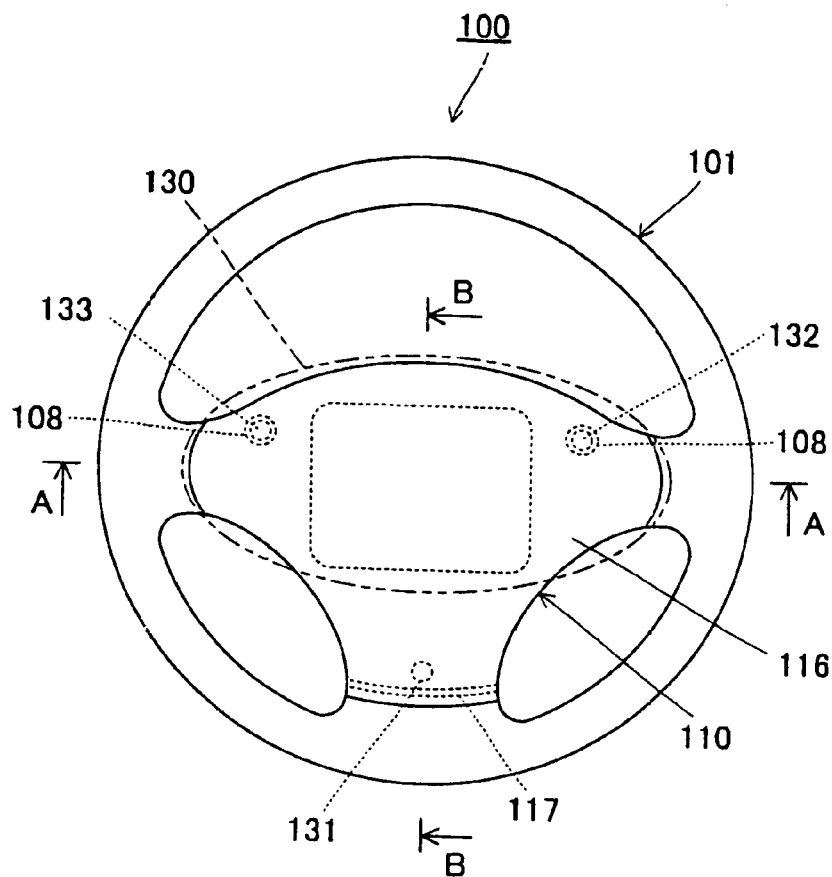
FIG. 1 is a plan view showing a steering apparatus of the present embodiment.

FIG. 1 is a plan view showing the steering apparatus 100 of the present embodiment. In addition, in the present embodiment, referring to the plan view of the steering apparatus 100, the right, the bottom and the left in FIG. 1 are respectively defined as the 'three-o-clock direction', the 'six-o-clock direction' and the 'nine-o-clock direction'.

As shown in FIG. 1, the steering apparatus 100 has an annular steering wheel 101 used for steering a vehicle by a vehicle occupant, and an air bag module 110 is mounted within the outer shape of the steering wheel 101. The steering wheel 101 shown in FIG. 1 is a so-called '3-spoke' steering wheel which has portions which extend in the three-o-clock direction, the six-o-clock direction and the nine-o-clock direction within the outer shape appearance of the steering wheel 101. The detailed description will be made below, but in the steering apparatus 100, a module cover 116 constituting the airbag module 110 is positioned with respect to the steering wheel 101 by means of positioning portions 131, 132 and 133 at the bottom (a position in the six-o-clock direction), the right (a position in the three-o-clock direction) and the left (a position in the nine-o-clock direction) in FIG. 1. Also, in a lower area of the module cover 116, the module cover 116 has a fulcrum 117 in the vicinity of the positioning portion 131, and the module cover is elastically biased toward a vehicle occupant by a coiled spring 108 sandwiched between the positioning portions 132 and 133. The coiled spring 108 corresponds to 'biasing means' or a 'coiled spring'. A horn operation area 130 of the module cover 116 is defined as an area where a horn is operated by a vehicle occupant's pressing action.

Figure 2:
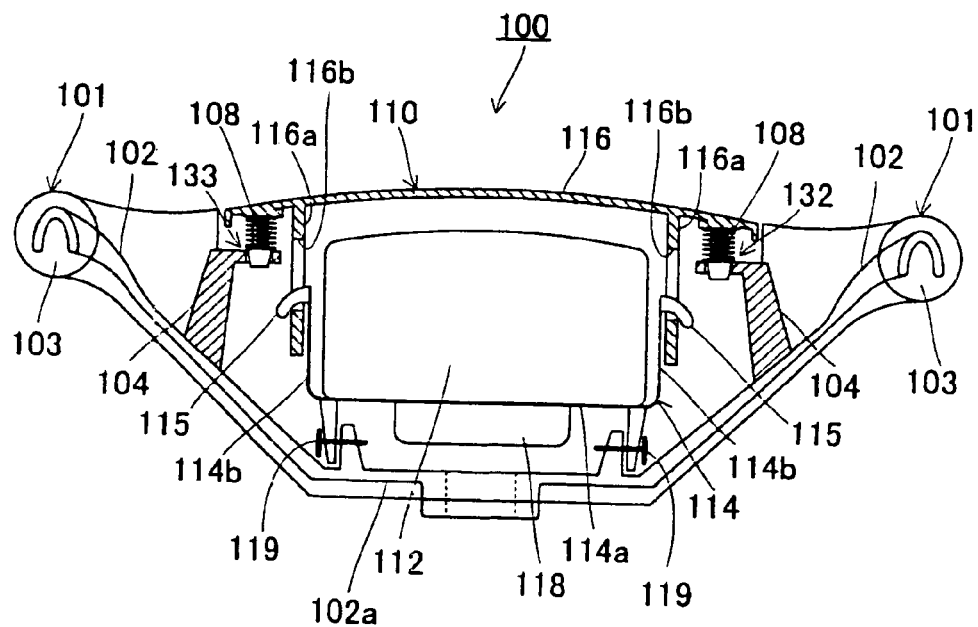
FIG. 2 shows a sectional structure taken along the line A-A in FIG. 1.
Figure 3:
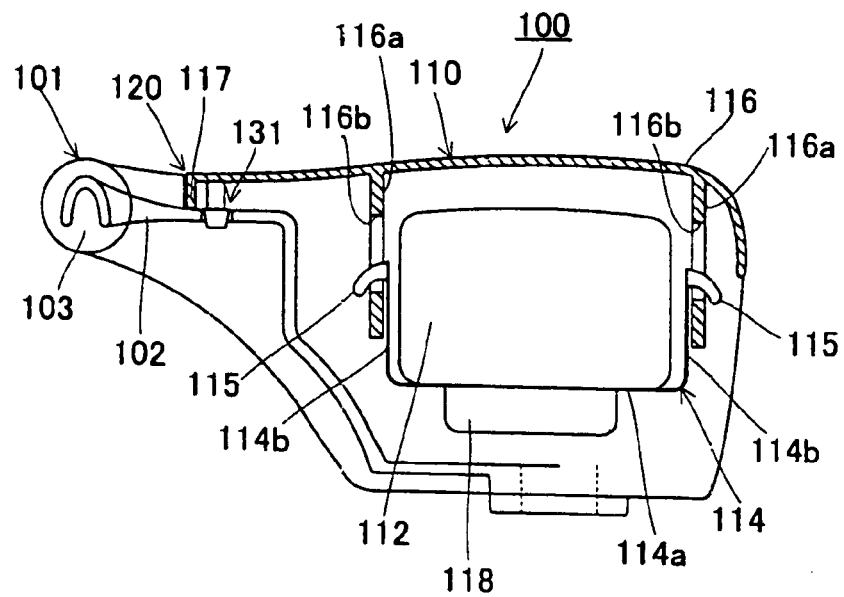
FIG. 3 shows a sectional structure taken along the line B-B in FIG. 1.

FIG. 2 shows a sectional structure taken along the line A-A in FIG. 1. FIG. 3 shows a sectional structure taken along the line B-B in FIG. 1.

As shown in FIGS. 2 and 3, in the steering wheel 101, the circumference of an annular cored bar 102 made of a metallic material is covered with a urethane resin 103. The airbag module 110 is mounted to a cover counter-surface 102a ('cover counter-surface' in the present invention) opposite to the module cover 116 of the steering wheel 101 with bolt members 119. This steering wheel 101 corresponds to the 'steering wheel' for steering a vehicle in the present invention.

The airbag module 110 comprises an airbag 112 which is deployed and inflated toward a vehicle occupant protection area at the time of collision, a retainer 114 for accommodating the airbag 112 in a state folded in a predetermined shape, the module cover 116 for covering a portion of the airbag 112 facing a vehicle occupant, an inflator 118 which can supply the airbag 112 with gas for deploying and inflating the airbag. The airbag module 110 constitutes the 'airbag device' in the present invention.

When the inflator 118 is operated and the airbag 112 is supplied with gas for deploying and inflating the airbag at the time of collision, the airbag 112 is a member which operates to be deployed and inflated toward a vehicle occupant protection area while tearing the module cover (module pad) 116 open along a tear line (not shown). The airbag 112 corresponds to the 'airbag' in the present invention.

The retainer 114 comprises a bottom 114a formed along the cover counter-surface 102a, an upright portion 114b extending from the bottom 114a toward the module cover 116, an extended piece 115 extending from an upper end of the upright portion 114b in an outer peripheral direction. The entire retainer 114 is formed in a shape of a box made of a metallic material. The retainer 114 corresponds to the 'retainer' of the present invention, and the upright portion 114b of the retainer 114 corresponds to the 'upright portion' of the present invention.

The module cover 116 comprises a leg portion 116a, elongated holes 116b, the fulcrum 117 and the positioning portions 131, 132 and 133. The leg portion 116a is a portion which extends from an extending surface of the module cover 116 toward the cover counter-surface 102a. The leg portion 116a corresponds to the 'leg portion' of the present invention. The elongated hole 116b is formed longitudinally (straight) along the extending direction (the vertical direction in FIGS. 2 and 3) of the leg portion 116a, and is a portion which respectively engages the extended piece 115 of the upright portion 114b constituting the retainer 114. The elongated holes 116b correspond to the 'elongated holes' in the present invention. The elongated hole 116b allows the module cover 116 to move relative to the retainer 114 in the extending direction of the leg portion while it respectively engages the extended piece 115 of the retainer 114. Specifically, the module cover 116 is constructed so as to have a predetermined range of play relative to the retainer 114. The fulcrum 117 is provided in the vicinity of a spoke (in the vicinity of the positioning portion 131) which is located in the six-o-clock direction of the steering wheel 101, and is a portion which extends toward the cored bar 102 at an end of the module cover 116 in its six-o-clock direction. The fulcrum 117 is also constructed to abut the cored bar 102. Further, the fulcrum 117 is provided above the center of gravity of the airbag module 110. The fulcrum 117 corresponds to the 'fulcrum' of the present invention. The positioning portions 131, 132 and 133 are portions which extend in a shaft shape toward the cover counter-surface 102a from the farther outer peripheral side than the leg portion 116a.

The positioning portions 132 and 133 engage the extended portion 104 of the cored bar 102 and the positioning portion 131 engages the cored bar 102, so that the module cover 116 constructed as above is positioned in the steering wheel 101. In this case, the module cover 116 of the present embodiment is constructed as an airbag cover for covering the side of the airbag 112 facing a vehicle occupant, while the module cover 116 is a member which is pressed by a vehicle occupant to sound a horn. The module cover 116 corresponds to the 'horn operating cover' of the present invention.

The module cover 116 of the present embodiment is constructed to turn about the fulcrum 117 in a direction of an initial position and a horn operating position. In this case, the fulcrum 117 is constructed as a fulcrum which is formed in a fixed portion at all times independently from a pressed position of the module cover 116 by a vehicle occupant. If the module cover 116 turns to the horn operating position, the horn is operated. On the contrary, if the module cover 116 turns to the initial position, the operation of the horn stops.

Figure 4:
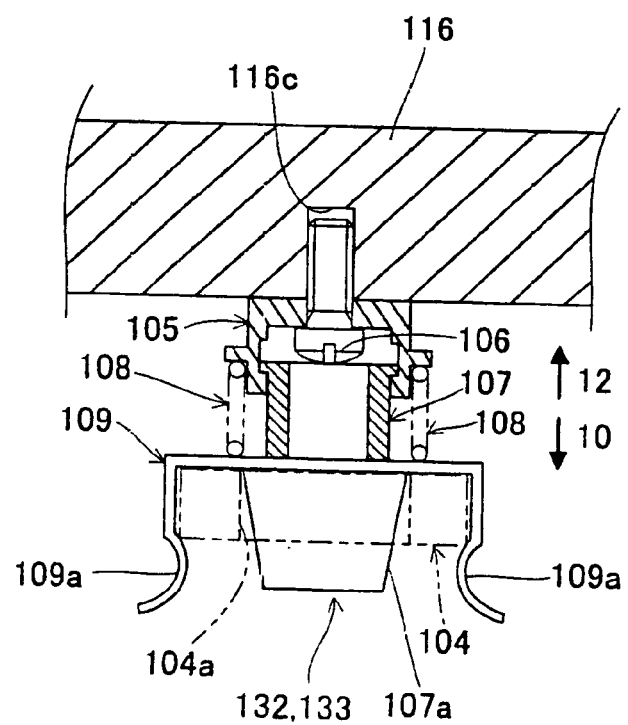
FIG. 4 is a partially enlarged view around positioning portions.
Figure 5:
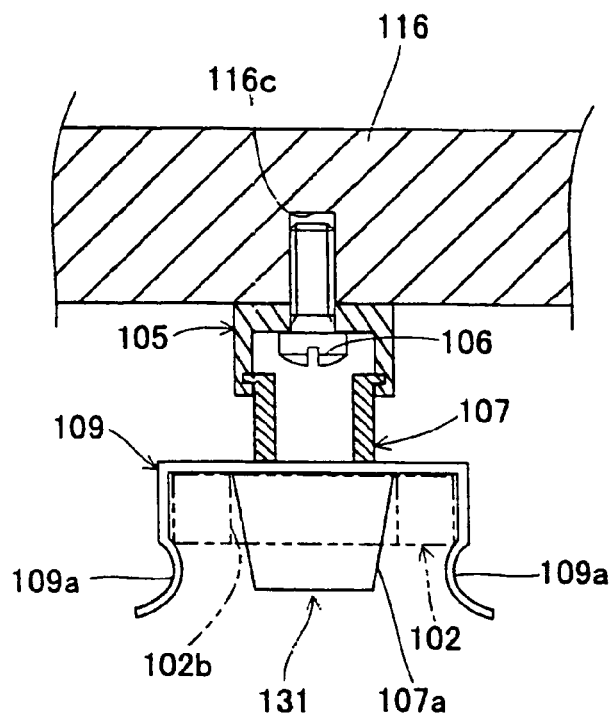
FIG. 5 is a partially enlarged view around a positioning portion.

A construction in the vicinity of the positioning portions 131, 132 and 133 will be described with reference to FIGS. 4 and 5. FIG. 4 is a partially enlarged view in the vicinity of the positioning portions 132 and 133 in FIG. 2. FIG. 5 is a partially enlarged view in the vicinity of the positioning portion 131 in FIG. 3.

As shown in FIG. 4, the positioning portions 132 and 133 are respectively constructed by using a first shaft member 105, a fixing bolt 106, and a second shaft member (insulator) 107. The first shaft member 105 is constructed to be bolted to the module cover 116 with the fixing bolt 106 screwed into a bolt hole 116c. The first shaft member 105 may be integrally molded with the module cover 116, and may be integrally molded with the second shaft member 107. The second shaft member 107 is allowed to move in an axial direction (in a direction of the arrow 10 or 12 in FIG. 4) with respect to the first shaft member 105 by the engaging relationship between a claw and an elongated hole. Also, the second shaft member 107 is fastened to the first shaft member 105 in a state elastically biased in the direction of the arrow 10 in FIG. 4 by the coiled spring 108. A front end of the second shaft member 107 (the 'shaft member' in the present invention) is constructed such that its outer diameter corresponds to the inner diameter of a fitting hole 104a (the 'fitting hole' in the present invention) formed at the extended portion 104 of the cored bar 102, and can be fitted into the fitting hole 104a. Also, the front end of the second shaft member 107 is provided with a tapered portion 107a whose outer diameter (shaft diameter) is decreased in such a manner as to be inclined toward the front end. This tapered portion facilitates the fitting of the second shaft member into the fitting hole 104a.

In addition, the outer diameter (shaft diameter) of the second shaft member 107 is appropriately set to, typically, a range of 5 mm to 15 mm. Further, the fitting hole 104a is used as a positioning hole in molding the cored bar 102 with urethane.

A slip-off preventing member 109 of the concerned positioning portions 132 and 133 is a member which prevents the second shaft member 107 fitted into the fitting hole 104a of the extended portion 104 from slipping off from the concerned fitting hole 104a. The extended portion 104 is pinched between elastically deformable slip-off preventing pieces 109a provided at both the ends of the slip-off preventing member 109, so that the second shaft member 107 can be prevented from slipping off from the fitting hole 104a. This slip-off preventing member 109 is provided integrally with the second shaft member 107 in a state elastically biased in the direction of the arrow 10 in FIG. 4 with respect to the first shaft member 105 by the coiled spring 108. The slip-off preventing member 109 corresponds to the 'slip-off preventing means' in the present invention. By this construction, the module cover 116 is fastened to the steering wheel 101 in a state that is positioned at the positioning portions 132 and 133. As described above, the second shaft member 107, the fitting hole 104a, the slip-off preventing member 109 at the positioning portions 132 and 133 are means which fasten the module cover 116 to the steering wheel 101, and constitute the 'fastening means' in the present invention.

As shown in FIG. 5, the positioning portion 131 is constructed using a first shaft-shape member 105, a fixing bolt 106 and a second shaft-shape member 107. The first shaft member 105 is bolted to a bolt hole 116c of the module cover 116 with the fixing bolt 106. The second shaft member 107 is fastened to the first shaft member 105 in a fixed state. A front end of the second shaft member 107 is constructed such that its outer diameter corresponds to an inner diameter of a fitting hole 102b (the 'fitting hole' in the present invention) formed in the cored bar 102, and can be fitted into the fitting hole 102b. Also, the front end of the second shaft member 107 is provided with a tapered portion 107a whose outer diameter is decreased in such a manner as to be inclined toward the front end. This tapered portion 107a facilitates the fitting of the second shaft member into the fitting hole 102b.

The slip-off preventing member 109 of the concerned positioning portion 131 is a member that prevents the second shaft member 107 fitted into the fitting hole 102b of the cored bar 102 from slipping off from the concerned fitting hole 102b. The cored bar 102 is pinched between elastically deformable slip-off preventing pieces 109a provided at both the ends of the slip-off preventing member 109, so that the second shaft member 107 can be prevented from slipping off from the fitting hole 102b. By this construction, the module cover 116 is fastened to the steering wheel 101 in a state that is positioned at the positioning portion 131. As described above, the second shaft member 107, the fitting hole 102b, the slip-off preventing member 109 at the positioning portion 131 are means which fasten the module cover 116 to the steering wheel 101, and constitute the 'fastening means' in the present invention.

Next, an assembling method of assembling the airbag module 110 into the steering wheel 101 related to a method of manufacturing the steering apparatus 100 constructed as above will now be described referring to FIGS. 6 to 8. FIG.

6 shows a state of assembling an airbag module 110 into the steering wheel 101 of the present embodiment. FIG. 7 is a view showing the movement of the positioning portions 132 and 133 when the airbag module 110 of the present embodiment is assembled. FIG. 8 shows the movement of the positioning portion 131 when the airbag module 110 is assembled.

Figure 6:
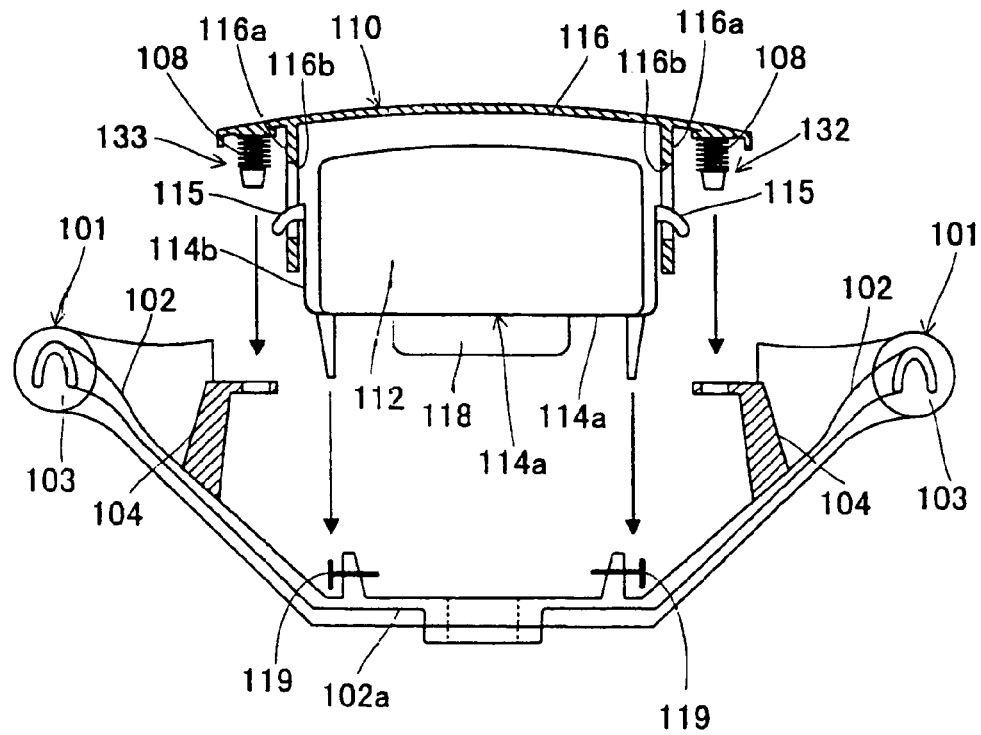
FIG. 6 shows a state of assembling an airbag module into a steering wheel of the present embodiment of the present invention.

As shown in FIG. 6, the airbag module 110, before being assembled into the steering wheel 101, is prepared as a pre-assembled body (the 'pre-assembled body' of the present invention) in which the module cover 116 is already assembled in the retainer 114. Then, the integrated pre-assembled body (the airbag module 110) is placed on the cover counter-surface 102a of the steering wheel 101, and the module cover 116 is fastened to the steering wheel 101 after being positioned at the positioning portions 131, 132 and 133. Thereafter, the retainer 114 is mounted to the steering wheel 101 with the bolt member 119. As a result, the steering apparatus 100 (the steering apparatus 100 in FIG. 2) in which the airbag module 110 provided with the module cover 116 is assembled into the steering wheel 101, is manufactured.

Figure 7:
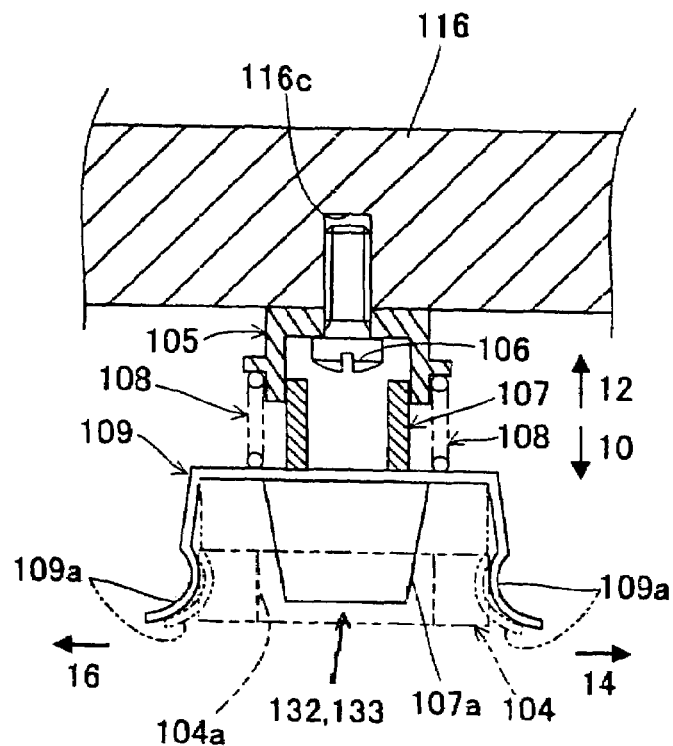
FIG. 7 shows movement of the positioning portions when the airbag module 100 of the present embodiment is assembled.
Figure 8:
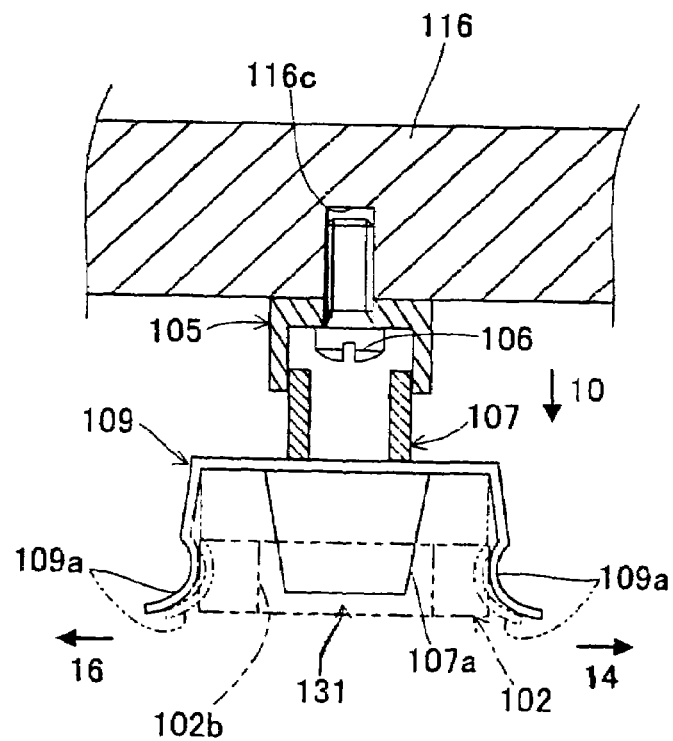
FIG. 8 shows movement of the positioning portions when the airbag module of the present embodiment is assembled.

In addition, when the module cover 116 is fastened to the steering wheel 101, the slip-off preventing member 109 of the positioning portions 132 and 133, as shown in FIG. 7, first expands in the directions of the arrow 14 and 16 at the slip-off preventing pieces 109a which abut the extended portion 104. Then, the slip-off preventing pieces 109a return to their original state by their elasticity and operate to pinch the extended portion 104 therebetween. Similarly, the slip-off preventing member 109 of the positioning portion 131, as shown in FIG. 8, first expands in the directions of the arrows 14 and 16 at the slip-off preventing pieces 109a which abut the cored bar 102. Then, the slip-off preventing pieces 109a return to their original state by their elasticity and operate to pinch the cored bar 102 therebetween them. In this way, the module cover 116 is allowed to insert the slip-off preventing member 109 by only the pressing operation, so that the module cover 116 is easily fastened to the steering wheel 101 with the slip-off preventing member 109 in a one-touch manner.

Figure 9:
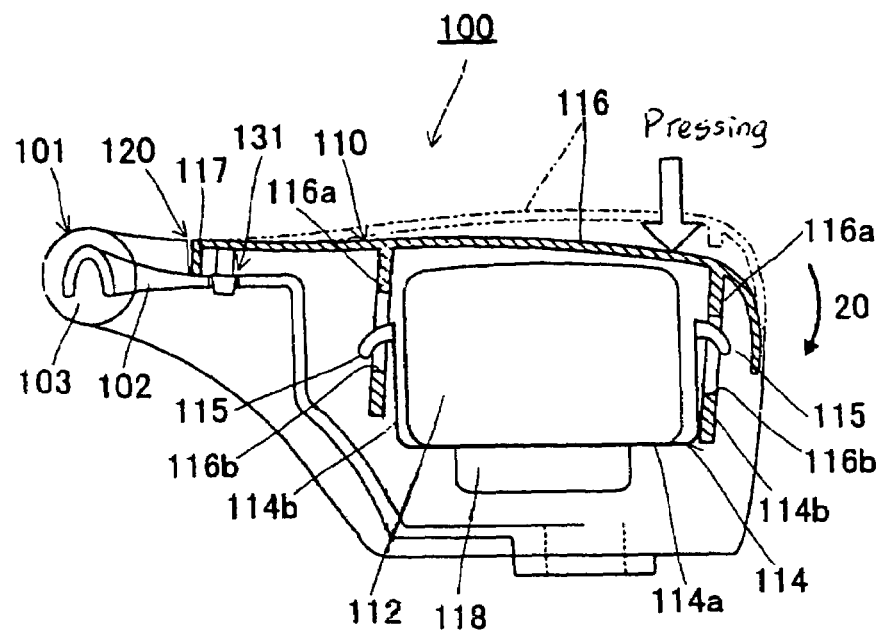
FIG. 9 shows a state when a module cover in FIG. 3 has turned from an initial position to a horn operating position.
Figure 10:
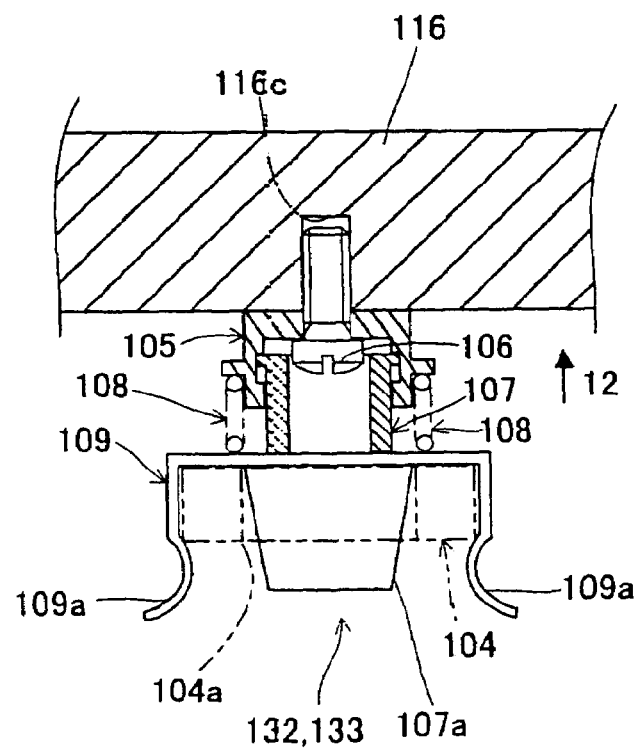
FIG. 10 shows a state when the module cover in FIG. 4 has turned from the initial position to the horn operating position.

Next, the operation of the steering apparatus 100 constructed with the above means will be described with reference to FIGS. 9 and 10. FIG. 9 shows a state when the module cover 116 of FIG. 3 has turned from an initial position to a horn operating position. FIG. 10 shows a state when the module cover 116 in FIG. 4 has turned from the initial position to the horn operating position.

In the steering apparatus 100 in FIG. 9, two-dot chain lines in the drawings indicate the initial position (waiting position) of the concerned module cover 116 before the module cover 116 is pressed by a vehicle occupant. The module cover 116 at the initial position turns from the initial position indicated by two-dot chain lines toward the horn operating position indicated by solid lines in FIG. 9, for instance, by pressing the horn operation area (the horn operation area 130 in FIG. 1) in the direction of the white arrow in FIG. 9. Specifically, since the elongated hole 116b is constructed to allow the module cover 116 to move relative to the retainer 114 in the extending direction of the leg portion 116a, the module cover 116 turns about the fulcrum 117 in the direction of the arrow 20 in FIG. 9. In this case, as for the positioning portions 132 and 133, as shown in FIG. 10, the module cover 116 moves in a direction closer to the extended portion 104 against the elastic biasing force of the coiled spring 108 in the direction of the arrow 12.

In addition, the module cover 116 of the present embodiment, is a so-called 'castanet type module cover' because it turns in such a manner. Further, the pressed direction of the module cover 116 by a vehicle occupant is enough as long as a pressing force component from the initial position toward the operation position is applied to the module cover 116. Further, the pressed direction of the module cover 116 by a vehicle occupant may coincide with the direction of the white arrow in FIG. 9, and may cross the direction of the white arrow.

Accordingly, as a movable contact (not shown) of the module cover 116 at the horn operating position abuts and contacts a fixed contact (not shown) of the steering wheel, both the contacts are electrically connected to each other. By this construction, a horn mechanism (corresponding to the 'horn mechanism' of the present invention) is turned on to sound the horn. On the contrary, if the pressing operation in the horn operation area is released, the abutment between both the contacts is released by the elastic biasing force in the direction of the arrow 12, thereby turning the horn mechanism off. In addition, besides the contact type horn mechanism, a strain gauge and press reduction means having already known constructions can be employed as the horn mechanism of the present embodiment.

As described above, according to the above embodiment, because the fulcrum 117 is placed in the vicinity of the outer peripheral portion of the module cover 116 in its six-o-clock direction, the outer peripheral portion of the module cover 116 becomes difficult to move relative to the steering wheel 101. As a result, the gap between the outer peripheral portion of the module cover 116 and the steering wheel 101, specifically, the gap 120 in FIGS. 3 and 9, becomes extremely small, which leads to an improved appearance of the steering apparatus 100.

Further, in the present embodiment, the fulcrum 117 of the module cover 116 is always formed at a definite lower area (in the vicinity of a spoke positioned in the six-o-clock direction of the steering wheel 101) of the horn operating cover independently from pressed positions by a vehicle occupant, which effectively stabilizes the turning movement of the module cover 116. Further, according to this construction, an upper area of the module cover 116, to which vehicle occupant's hands are easily accessible while a vehicle occupant holds the steering wheel 101 with his/her hands, can be a pressing operation area, which secures good operability of the module cover 116.

Also, the module cover 116 turning about the fulcrum 117 is used in the present embodiment, so that the module cover 116 is reliably turned to the operation position with a small pressing load, which improves the operability of the module cover 116 related to the horn operation. In the present embodiment, especially, the module cover 116 moves independently from the airbag module 110 fixed to the steering wheel 101, so a pressing load in operating the horn is lessened compared to a module cover integrally moving with an airbag module. Further, the provision of the fulcrum 117 of the module cover 116 lessens the number of biasing means which biases the module cover 116 toward the initial position, and the adjustment of a biasing force by the biasing means becomes easy when varying the size of the module cover 116. Meanwhile, because the very airbag module 110 is fastened to the cover counter-surface 102a in a fixed state, the airbag 112 is effectively deployed independently from the turning movement of the module cover 116.

Further, according to the present embodiment, because the module cover 116 comprises the fulcrum 117 above the center of gravity of the airbag module 110, an area formed above the center of gravity of the airbag module 110 can be effectively used as an area where the fulcrum 117 is placed.

Further, according to the present embodiment, the module cover 116 smoothly turns in cooperation with the upright portion 114b of the retainer 114 and the elongated hole 116b of the module cover 116.

Further, according to the present embodiment, the second shaft member 107, the fitting hole 104a, the slip-off preventing member 109 are used as means to fasten the module cover 116 to the steering wheel 101, which enhances the assembling property when the module cover 116 is fastened to the steering wheel 101.

Further, according to the present embodiment, the coiled spring 108 is used for biasing the module cover 116 fastened to the steering wheel 101 toward the initial position.

According to the present embodiment, because the airbag module 110 can be assembled into the steering wheel 101 along with the module cover 116, the mountability of the steering apparatus 100 can be improved.

In addition, the present invention is not limited to the above embodiment, and various kinds of application and modification can be considered. For instance, each type applying the above embodiment can be embodied as below.

In the first embodiment, the coiled spring 108 is used as the biasing means which biases the module cover 116 toward the initial position, but other biasing means such as a plate spring, air pressure, means using elasticity of materials can be used as the concerned biasing means. Here, when a plate spring is used as biasing means, the construction and operation will be described with reference to FIGS. 11 to 13. As for these Figures, the same elements as the elements shown in FIGS. 1 to 10 will be denoted by the same reference numerals, and the concerned elements will not be described in detail.

Figure 11:
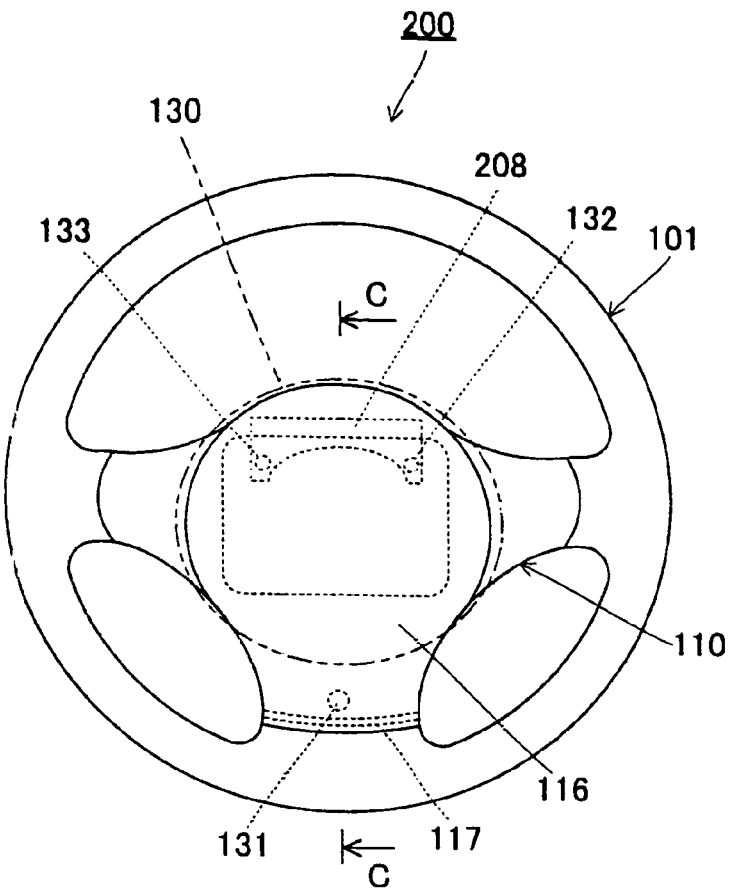
FIG. 11 is a plan view showing a steering apparatus of another embodiment using a plate spring as biasing means which biases the module cover toward the initial position.
Figure 12:
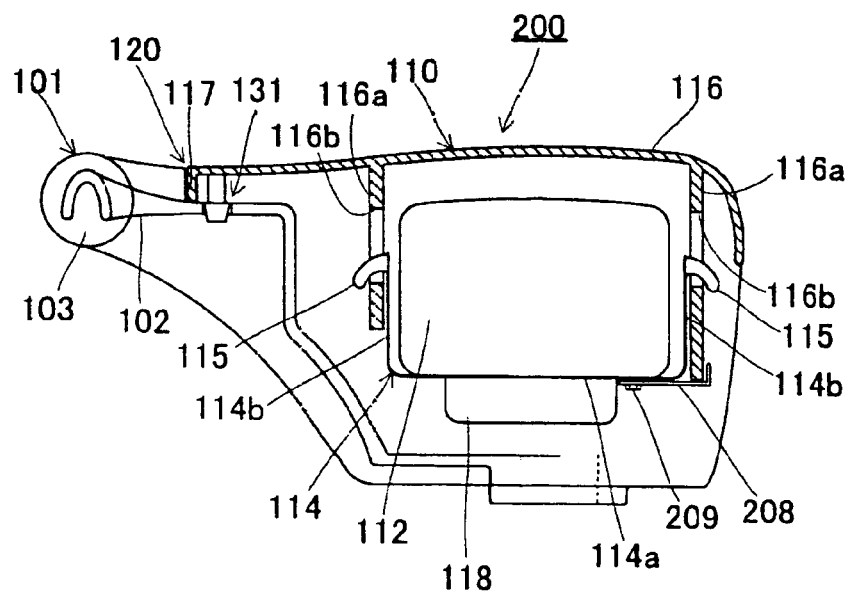
FIG. 12 is a sectional view taken along the line C-C in FIG. 11 of the steering apparatus.
Figure 13:
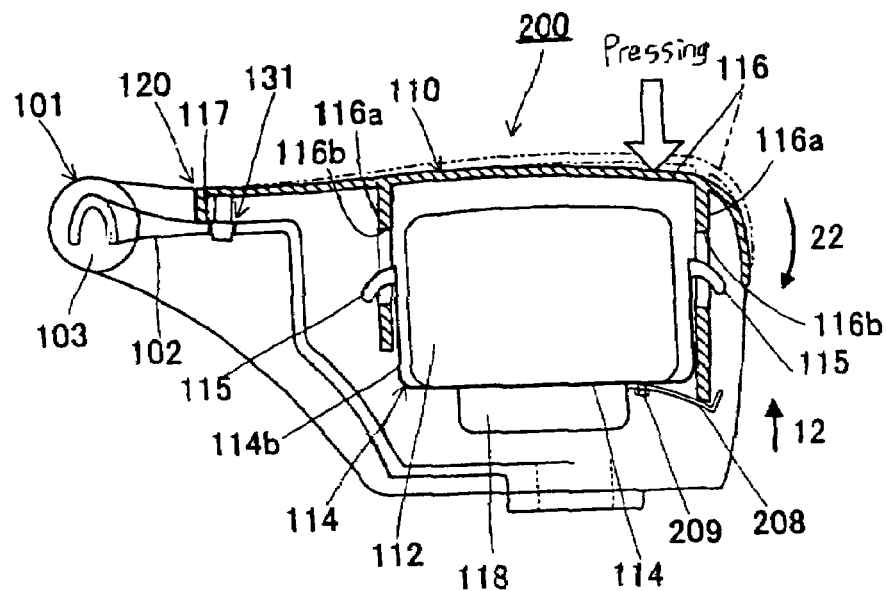
FIG. 13 shows a state when a module cover in FIG. 12 has turned from the initial position to a horn operating position.

FIG. 11 is a plan view showing a steering apparatus 200 of another embodiment (the 'steering apparatus' according to the present invention) using a plate spring 208 as biasing means which biases the module cover 116 toward the initial position. FIG. 12 is a sectional structural view taken along the line C-C in FIG. 11. FIG. 13 shows a state when a module cover 116 in FIG. 12 has turned from the initial position to the horn operating position.

As shown in FIG. 11, the module cover 116 of the steering apparatus 200 has a width between the three-o-clock direction and the nine-o-clock direction shorter than that of the steering apparatus 100. In the construction having the module cover, as shown in FIG. 12, a plate spring 208 is sandwiched between the leg portion 116a of the module cover 116 and the retainer 114. With the plate spring 208 disposed below the retainer 114, one end of the plate spring 208 is bolted to the bottom 114a of the retainer 114, that is, a bottom of the airbag module 110 with a fixing bolt 209, while the other end of the plate spring 208 extends in a direction of the leg portion 116a at the positioning portions 132 and 133 and supports the concerned leg portion 116a from the bottom. The plate spring 208 corresponds to the 'biasing means' or the 'coiled spring' of the present invention. It is desirable for the fixing bolt 209 to be combined with a fixing bolt fixing the inflator 118 in the retainer 114. By this construction, the number of parts is reduced. Also, as the plate spring 208 is mounted in the bottom of the airbag module 110, the biasing means is effectively mounted in a reduced space. Namely, the steering apparatus 200 constructed as mentioned above is effective in a module cover whose lower area has a smaller width, for instance, especially when enough space is not available to accommodate biasing means such as the coiled spring 108 and the like in the three-o-clock direction and the nine-o-clock direction.

As shown in FIG. 13, the module cover 116 turns from the initial position indicated by two-dot chain lines in the drawing toward the horn operating position indicated by solid lines, by pressing the horn operation area (the horn operation area 130 in FIG. 11) in the drawing. Namely, because the elongated holes 116b are constructed to allow the module cover 116 to relatively move in the extending direction of the leg portion 116a, the module cover 116 turns about the fulcrum 117 in the direction of the arrow 22 direction in FIG. 9. At this time, as for the positioning portions 132 and 133, the module cover 116 moves in a direction closer to the extended portion 104 against the elastic biasing force of the plate spring 208 biased in the direction of the arrow 12.

Accordingly, as a movable contact (not shown) of the module cover 116 at the horn operating position contacts a fixed contact (not shown) of the steering wheel, both the contacts are electrically connected to each other. By this construction, a horn mechanism (not shown) is turned on and sounds the horn. On the contrary, if the pressing operation on the horn operation area is released, the abutment between both the contacts is released by the elastic biasing force of the plate spring 208 biased in the direction of the arrow 12, thereby turning off the horn mechanism.

Figure 14:
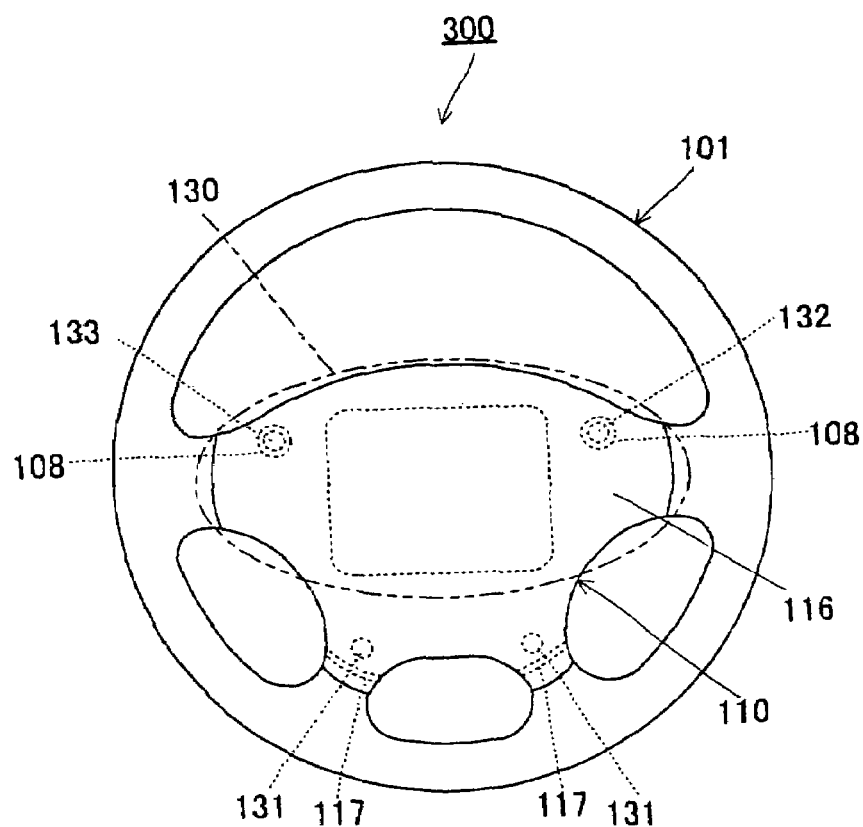
FIG. 14 shows a steering apparatus of another embodiment.

Also, in the above embodiments, the steering wheel having the so-called '3-spoke' steering wheel is described. However, the present invention can be applied to, for instance, a steering apparatus 300 (the 'steering apparatus' according to the present invention) having a so-called '4-spoke' steering wheel as shown in FIG. 14. As for the steering apparatus 300 of another embodiment of FIG. 14, the steering wheel 101 is the so-called 4 spoke steering wheel which has extending parts within the appearance of the steering wheel 101 in the three-o-clock direction, the four to five-o-clock direction, the seven to eight-o-clock direction and the nine-o-clock direction. The steering apparatus 300 uses substantially the same elements as the steering apparatus 100 (the airbag module 110, the module cover 116, the fulcrum 117, and the positioning portions 131, 132 and 133), by which the same working effects as the steering apparatus 100 can be achieved.

Also, in the above embodiments, the fulcrum 117, formed at a fixed area of the horn operation area independently from pressed positions of the module cover 116 by a vehicle occupant, is described. However, in the present invention, an area where the fulcrum is formed can be varied according to pressed positions of the module cover 116 by a vehicle occupant. Specifically, as for the steering apparatus 100 shown in FIG. 3, the same coiled spring 108 as the positioning portions 132 and 133 is provided at the positioning portion 131, and the module cover 116 is fastened to the steering wheel 101 in a floating state. When constructed in this way, if the concerned module cover turns about the fulcrum by the pressing operation of the module cover 116, the same working effects as the steering apparatus 100 can be achieved.

Also, in the above embodiment, the steering wheel of cars is described, but the present invention can be applied to steering apparatuses of vehicles such as a vessel, an electric train etc.

What is claimed is:

1. A steering apparatus comprising:
a steering wheel for steering a vehicle;
a horn mechanism for sounding a horn;

an airbag device mounted to the steering wheel and including an airbag;

a cover mounted to extend over the airbag and for shifting independent of the airbag device to operate the horn mechanism;

a fulcrum about which the cover is shifted by pivoting of the cover to operate the horn mechanism; and a positioning portion of the cover including a depending shaft that cooperates with an upwardly facing aperture of the steering wheel to allow the cover to be lowered and assembled to the steering wheel with the shaft lowered to fit through the aperture for establishing a connection between the cover and the steering wheel adjacent the fulcrum that is fixed against linear shifting but which allows the cover to be pivoted relative to the steering wheel about the adjacent fulcrum.

2. The steering assembly of claim 1 wherein the steering wheel generally includes an upper portion spaced from the cover, and the fulcrum is adjacent the steering wheel upper portion to minimize the spacing between the cover and the steering wheel upper portion.

3. The steering wheel apparatus of claim 1 wherein the fulcrum is generally fixed relative to the cover to define a predetermined pivoting movement of the cover irrespective of where on the cover a horn actuating pushing force is applied to the cover.

4. The steering wheel apparatus of claim 1 wherein the fulcrum is integral with the cover.

5. The steering wheel apparatus of claim 1 wherein the fulcrum is below the cover.

6. The steering wheel apparatus of claim 1 wherein the airbag device has a center of gravity, and the fulcrum is above the airbag device center of gravity.

7. The steering wheel apparatus of claim 1 wherein the cover and steering wheel include a plurality of positioning portions with one of the positioning portions having the connection between the cover and steering wheel that is substantially fixed against linear shifting therebetween during shifting of the cover for operating the horn mechanism, and another of the positioning portions having a spring loaded connection between the cover and steering wheel to allow the cover to shift against a spring bias at the spring loaded connection for operating the horn mechanism.

8. The steering wheel apparatus of claim 7 wherein the fulcrum is adjacent the fixed connection positioning portion.

9. The steering wheel apparatus of claim 7 wherein the positioning portions include a pair of spring loaded positioning portions.

10. The steering wheel apparatus of claim 9 wherein the positioning portions are spaced to form a triangular arrangement thereof.

11. The steering wheel apparatus of claim 7 wherein the spring loaded positioning portion includes a coil spring.

12. The steering wheel apparatus of claim 1 wherein the cover and the airbag device have guide structure therebetween which guides shifting of the cover relative to the airbag device.

13. The steering wheel apparatus of claim 12 wherein the steering wheel has an annular peripheral portion, and the cover has a plurality of positioning assemblies for connecting the cover to the steering wheel with the positioning assemblies spaced about the guide structure between the steering wheel annular portion and the guide structure with one of the positioning assemblies being the positioning portion.

14. The steering wheel apparatus of claim 1 wherein the steering wheel has an annular peripheral portion and radially extending spoke portions with the fulcrum arranged along one of the spoke portions.

15. A steering apparatus comprising:

a steering wheel having a body including an upper, outer peripheral portion and a lower support surface;

a horn mechanism;

an airbag device having an airbag and a retainer mounted to the lower support surface, and a predetermined center of gravity;

a cover mounted to extend over the airbag so that there is a gap between the cover and the upper, outer peripheral portion of the steering wheel body;

an upstanding wall of the retainer having an upper end thereof below the cover and above the center of gravity of the airbag device;

a shelf wall of the steering wheel body adjacent the upper, outer peripheral portion of the steering wheel body and above the upper end of the retainer upstanding wall; and a depending rigid projection extending downward from the cover adjacent an outer periphery of the cover to engage the shell wall portion for pivoting thereabout so that the depending rigid projection forms an outer fulcrum about which the cover pivots for operating the horn mechanism with the outer fulcrum having a predetermined fixed location adjacent the gap and above the center of gravity of the airbag device to allow the size of the gap to be kept to a minimum.

16. The steering wheel apparatus of claim 15 wherein the cover has inoperative and operative positions relative to the horn mechanism with the cover being pivoted between the inoperative and operative positions independent of the airbag device.

17. The steering wheel apparatus of claim 15 wherein the retainer includes an upstanding portion and the cover includes a depending portion with one of the retainer and cover portions including a transverse projection and the other of the retainer and cover portions including an elongate slot in which the projection extends with the projection moving longitudinally in the slot for guiding pivoting of the cover relative to the retainer.

18. A steering apparatus comprising:

a steering wheel having a body including an upper, outer peripheral portion and a lower support surface;

a horn mechanism;

an airbag device having an airbag and a retainer mounted to the lower support surface, and a predetermined center of gravity;

a cover mounted to extend over the airbag so that there is a gap between the cover and the upper, outer peripheral portion of the steering wheel body; and a fulcrum about which the cover pivots for operating the horn mechanism, the fulcrum having a predetermined fixed location adjacent the gap and above the center of gravity of the airbag device to keep the size of the gap to a minimum;

wherein the retainer includes an upstanding portion and the cover includes a depending portion with one of the retainer and cover portions including a transverse projection and the other of the retainer and cover portions including an elongate slot in which the projection extends with the projection moving longitudinally in the slot for guiding pivoting of the cover relative to the retainer, and the retainer and the cover depending portion include a plate spring therebetween to bias the cover to an inoperative position relative to the horn mechanism.

19. The steering wheel apparatus of claim 17 wherein the cover and retainer portions including the transverse projection in the elongate slot are configured to keep the retainer and cover together as a preassembled unit for being mounted to the steering wheel.

\* \* \* \* \*

UNITED STATES PATENT AND TRADEMARK OFFICE
CERTIFICATE OF CORRECTION

PATENT NO.        : 7,387,312 B2  
APPLICATION NO.   : 11/115482  
DATED             : June 17, 2008  
INVENTOR(S)       : Ichiro Amamori Page 1 of 1

It is certified that error appears in the above-identified patent and that said Letters Patent is hereby corrected as shown below:

Column 13, line 57, after "have" insert --a--.  
Column 14, line 24, delete "shell" and insert --shelf-- therefor.

Signed and Sealed this

Twenty-third Day of September, 2008

JON W. DUDAS  
*Director of the United States Patent and Trademark Office*